United States Patent
Wilson

[15] 3,641,310
[45] Feb. 8, 1972

[54] ELECTRODE HOLDER FOR ARC WELDING

[72] Inventor: Phillip M. Wilson, 133 Whitelaw Ave., Wood River, Ill. 62095

[22] Filed: July 17, 1970

[21] Appl. No.: 55,790

[52] U.S. Cl.............................................................219/127
[51] Int. Cl.................................................................B23k 9/00
[58] Field of Search..................219/127, 98, 86, 78, 136, 130

[56] References Cited

UNITED STATES PATENTS

| 3,119,010 | 1/1964 | Kras et al. | 219/127 |
| 2,898,445 | 8/1959 | Slezak | 219/127 |

FOREIGN PATENTS OR APPLICATIONS

| 645,903 | 11/1950 | Great Britain | 219/98 |
| 421,334 | 3/1967 | Switzerland | 219/127 |
| 292,778 | 1/1968 | Australia | 219/127 |

Primary Examiner—R. F. Staubly
Assistant Examiner—J. G. Smith
Attorney—Polache, Saulsbury & Hough

[57] ABSTRACT

A device for welding with contact electrodes comprising a core having a metallic coating, includes an electrically insulative body with an outwardly extending handle. A metal chuck extends axially of the body and holds the electrode. A U-shaped frame has arms slidably inserted in the body and held by an adjustable clamp. A block slidable on the free ends of the arms is urged by springs toward the free ends of the arms. The block carries a removable cylindrical shroud for the electrode which extends through the shroud. An electric cable extends into the body and connects with the chuck. Interchangeable shrouds have differently shaped ends to conform with differently shaped surfaces of work to be welded.

9 Claims, 14 Drawing Figures

INVENTOR
PHILLIP M. WILSON
BY
Polachek & Saulsbury
ATTORNEY

PATENTED FEB 8 1972
3,641,310
SHEET 3 OF 3
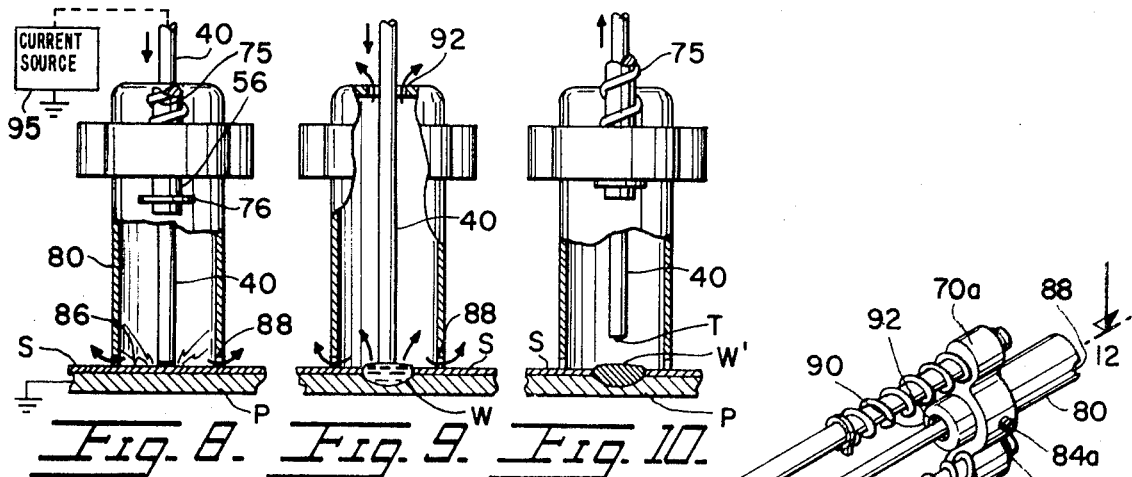
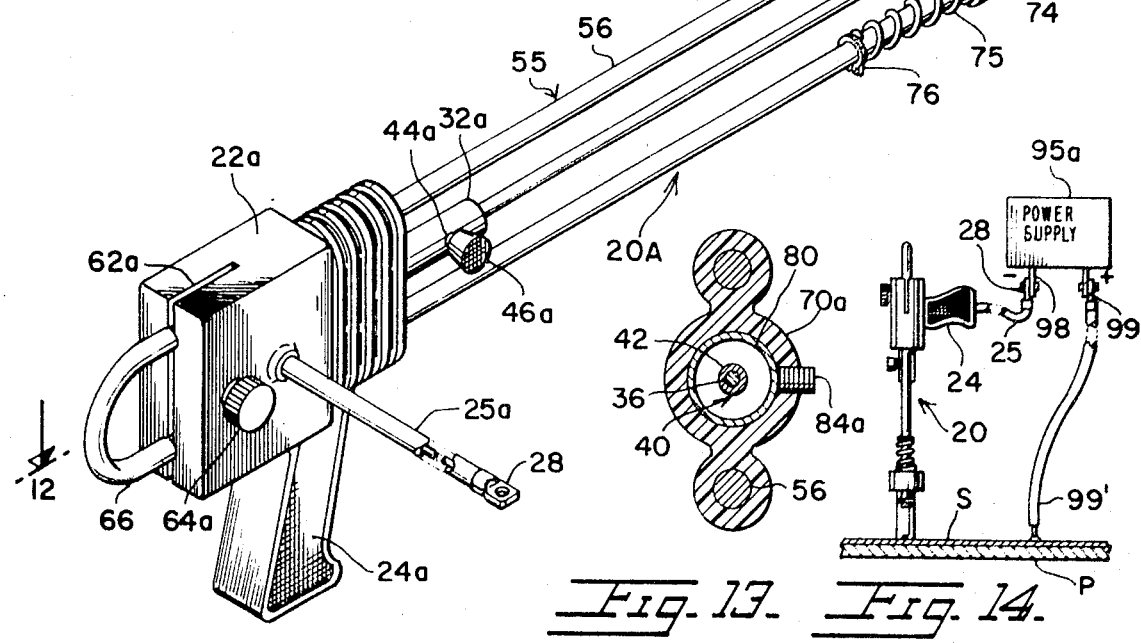
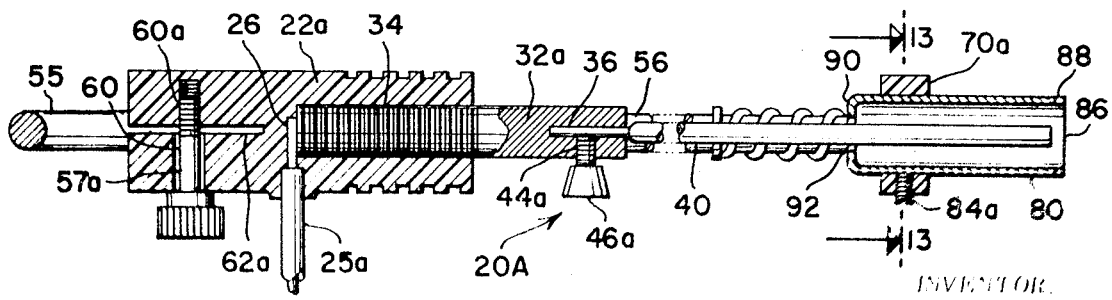
INVENTOR.
PHILLIP M. WILSON
BY Poluchek & Saulsbury
ATTORNEYS

ELECTRODE HOLDER FOR ARC WELDING

This invention concerns an improved electrode holder for use in arc welding.

The device is especially adapted for using contact electrodes of the type having an inner carbon core which is coated with a binder and compacted powdered metal. The coating is electrically conductive and will arc when contact is made with metal which is to be welded and is part of a welding circuit. As the electrode is withdrawn and the arc is extinguished, a droplet of the coating material including the powdered metal forms on the end of the electrode, which facilitates the start of the next welding operation.

Heretofore welding of sheet metal to heavier metal supports such as beams, bars and the like, was done by conventional welding equipment. The welding operator wore a bulky, cumbersome hood or shield. The equipment was not easily portable.

The present invention overcomes the difficulties and disadvantages of prior welding equipment by providing an electrode holder which does not require the operator to use a hood or shield. The flash generated during welding is entirely contained within a cylindrical shroud or flash tube surrounding the electrode at the welding point. The shroud serves as a heat sink or heat dissipator. The shroud is readily removable and interchangeable with others for working at inside or outside corners, on curved or on flat surfaces. According to the invention, the electrode is held in a chuck threaded into an insulated handle. A U-shaped frame is slidably engaged in the handle and slidably supports a block in which the shroud is removably secured. The block is spring loaded by springs on the arms of the frame. The electrode extends through the shroud. When the end of the shroud is placed against a metal member to be welded, axial pressure is applied to the handle and advances the frame and electrode. The frame slides frictionally in the handle when the springs are fully compressed to advance the electrode further as it becomes consumed during the welding process.

The electrode holder is useful for various types of welding work such as dot welding, welding antiskid projections on smooth metal surfaces, spot welding sheet metal to other sheet metal, welding sheet metal to heavy steel shapes, making uniform holes in sheet metal quickly, easily and safely, welding studs from the back of sheet metal, welding tacks between metal parts prior to final welding, etc.

Prior welding devices have been known which employed shrouds or flash tubes to contain the flash during welding. These have presented many obstacles to practical use. Most were heavy, complicated bulky machines. Usually the shroud was fixed and could not be readily interchanged with others. Some devices required operation of a trigger which actuated spring loaded members in a handle. None had the simplicity, reliability, ready portability, economy in manufacture, and versatility of the present device.

Other and further features, objects and advantages of the invention will become apparent from the following detailed description, taken together with the drawing, wherein:

FIGS. 8, 9 and 10 are elevational views partially in section of one end of a welding device showing stages in a welding operation.

FIG. 11 is a perspective view of another welding device embodying a modification of the invention.

FIG. 12 is a longitudinal sectional view taken on line 12—12 of FIG. 11.

FIG. 13 is a cross sectional view taken on line 13—13 of FIG. 12.

FIG. 14 is a reduced side elevational view of the welding device of FIGS. 1-3, showing it in a welding circuit performing a welding operation on metal members.

Figure 1:
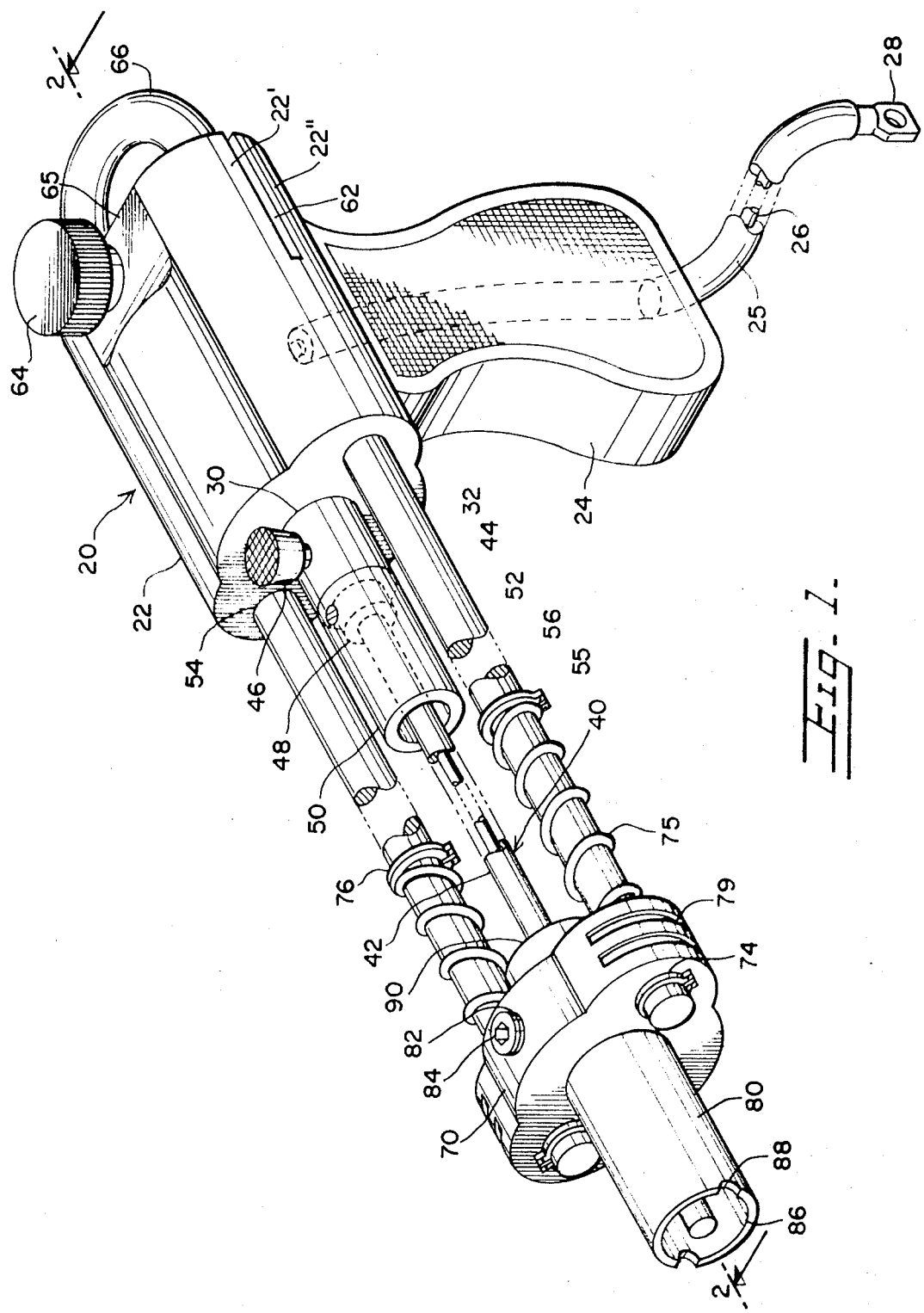
FIG. 1 is a perspective view of a welding device embodying the invention.
Figure 2:
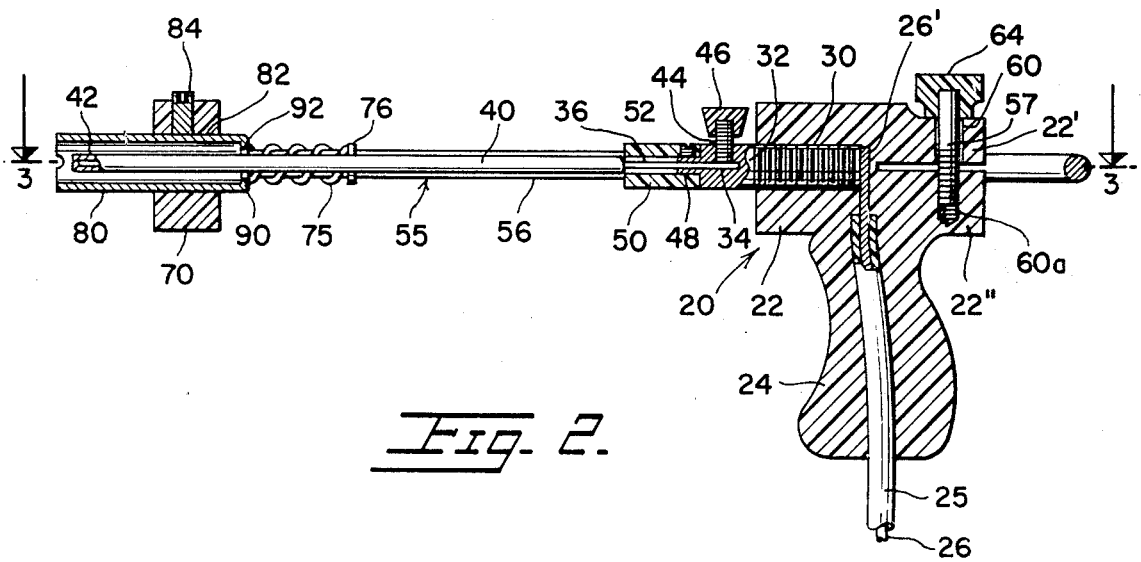
FIG. 2 is a reduced longitudinal sectional view taken on line 2—2 of FIG. 1.
Figure 3:
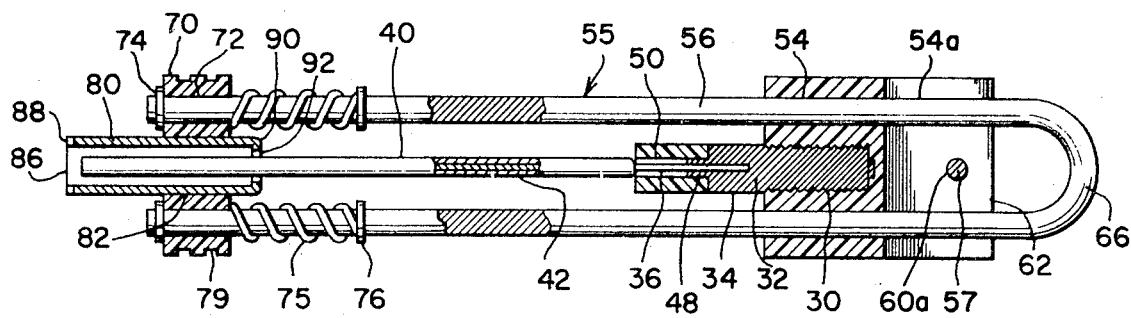
FIG. 3 is a longitudinal sectional view taken on line 3—3 of FIG. 2.

Referring first to FIGS. 1, 2 and 3, there is shown welding device 20 having an elongated stock or body 22 made of electrically insulative material such as high-impact plastic. Integral with body 22 and extending laterally outwardly thereof is a handle 24. Extending through the handle is an insulated cable 25 having a central heavy flexible wire 26 which is exposed at its flattened free end 26' inside body 22. This cable terminates in a lug 28 by means of which the cable can be connected to a source of welding current.

The body 22 has an axially extending threaded bore 30 in which is screwed a cylindrical metal chuck 32. The rear or inner end of the chuck is contacted by wire 26 so that there is direct electrical continuity between a source of welding current and chuck 32. In the forward or outer end of the chuck is a bore 34 in which fits the exposed end of core 36 of an electrode 40. The end of core 36 extends beyond the conductive metal coating or jacket 42 of the electrode and is engaged by metal screw 44 held by an insulated knob 46. Screw 44 is screwed in a lateral threaded hole in the chuck. Engaged on a tip 48 of reduced diameter at the end of the chuck is an insulated cylindrical sleeve 50 which shields the electrode 40 extending axially through the sleeve. A screw 52 holds the sleeve 50 on chuck tip 48.

The body 22 is further formed with a pair of axially extending parallel bores 54. Parallel arms 56 of a U-shaped metal frame 55 extend through these bores and are frictionally slidable therein. Pressure on the arms 56 is adjustable by threaded bolt 57 engaged in a transverse bore 60 in body 22. The body 22 has a slot 62 formed centrally therein at its outer or rear end. The plane of this slot is parallel to the plane of frame 55 and perpendicular to the plane of handle 24. The inner end 60a of bore 60 at the blind end of the bore is threaded and engages bolt 57. On the outer end of the metal bolt is secured an insulated knob 64 which bears on a recessed portion 65 of the outer side of the handle. When the knob and bolt are adjustably tightened the spaced body portions 22', 22" can be drawn together to press against and clamp arms 56 which extend through recesses 54a at opposite sides of slot 62. Recesses 54a are aligned with bores 54 and are extensions of these bores; see FIG. 3. The curved bight 66 of frame 55 is spaced from the rear or upper end of body 22.

Arms 56 of frame 55 extend forwardly of body 22 and carry on their free ends at metal block 70. The arms 56 extend through parallel bores 72 in the block. Split spring rings 74 are engaged on the ends of arms at the forward or bottom face of the block. Coil springs 75 are engaged on the arms and bear on the other face or side of the block. At the other ends of the springs are further split spring rings 76. The rings 76 retain the springs and compress them when the body 22 carrying electrode 40 is moved axially forward. Block 70 has ridges and grooves 79 to radiate heat.

A cylindrical metal shroud or tube 80 is removably engaged in an axial bore 82 of the block by a setscrew 84. This particular shroud has a flat circular edge 86 formed with notches 88 through which fumes and heat can escape during a welding operation; see FIG. 4. The other end of the shroud is formed with a constriction 90 defining a narrow opening 92 through which electrode 40 passes and defining an annular opening around the electrode for escape of fumes and heat.

FIGS. 8, 9 and 10 show successive stages in a welding operation. The shroud or tube 80 is abutted at its flat-free end 86 to a metal sheet S which is to be welded to a metal plate P. Plate P can be grounder along with one terminal of a source 95 of electric current as indicated in FIG. 8, while electrode 40 is connected in circuit with the high-voltage terminal of current source 95. When handle 24 is pressed down axially of shroud 80, arms 56 of frame 55 move down along with electrode 20. Springs 75 are compressed and bear down on block 70. An arc A is generated at the lower end of the electrode which contacts sheet S as shown in FIG. 8. A puddle W of melted metal forms under electrode 40 as shown in FIG. 9. Sparks are retained by shroud 80 while fumes escape via notches 88 and opening 92.

FIG. 9 shows the electrode 40 being withdrawn by relaxation of downward pressure on body 22 and handle 24. The springs 75 expand and electrode 40 separates from sheet S leaving behind a button weld W'. A metal tip T forms on the free end of electrode. Initially the coating 42 covers the end of the core 36 as shown at the left in FIG. 2, to start the arc the first time the electrode is used. Thereafter the metal tip T forms after each welding operation to facilitate starting the arc for the next welding operation.

Figures 4, 5, 6, 7:
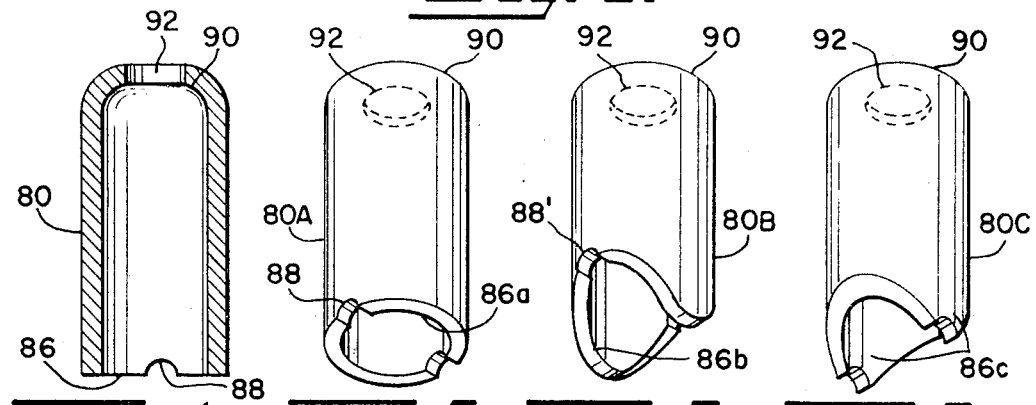
FIG. 4 is an enlarged sectional view of the shroud per se shown in section in FIGS. 2 and 3.
FIGS. 5, 6 and 7 are oblique views of other shrouds or flash tubes which can be interchanged with the shroud shown in FIGS. 1-4.

Shroud 80 with flat end 86 is used for welding on flat surfaces. FIG. 5 shows another similar shroud 80A in which the rim 86a of the shroud is cylindrically curved for abutting a curved surface to be welded. Diametrally opposed notches 88 are provided as in shroud 80. The opposite end of the shroud has constriction 90 with central opening 92 as in shroud 80. FIG. 6 shows a cylindrical shroud 80B formed with diametrally opposed V-shaped notches 86b whose sides may be 90° apart for abutting and welding an outside corner surface. Notches 88' at apices of notches 86b serve to release fumes and heat during welding. FIG. 7 shows a cylindrical shroud 80C whose bottom end is formed with V-shaped diametrally opposed points 86c each defining an angle of 90°. These points can be fitted into an inside corner of a metal surface to be welded. Notches 88'' at apices of points 86c release fumes and heat.

FIG. 14 shows another way the welding device 20 can be arranged in circuit with a current source or power supply 95a. Lug 28 at the end of cable 25 is connected to one terminal 98 of the power supply. The other terminal 99 is connected via wire 99' to sheet S to be welded to plate P underlaying sheet S.

FIGS. 11, 12 and 13 show another welding device 20A in which parts corresponding to those of welding device 20 are identically numbered. In device 20A, body 22a engages chuck 32a screwed into bore 30a. Frame 55 is slidably engaged in longitudinal bores in body 22a and arms 56 are adjustably held by bolt 57a which extends across slot 62a into threaded portion 60a of transverse bore 60. Bolt 57a carries adjustment knob 64a. Cable 25a extends into body 22a through a lateral wall and its single wire 26 is engaged with the end of stud 32a. Core 36 of electrode 40 is engaged in bore 34a in the end of the stud and is held by bolt 44a on which is knob 46a. Handle 24a is disposed in a plane of U-shaped frame 55. Block 70a at the free ends of arms 56 of the frame is held by spring clips 74. Spring 75 bear on the block and spring clips 76 retain the springs. The shroud or fire tube 80 is shown secured in bore 82a of block 70 by screw. In welding device 20A the adjustment knobs 46a, 64a and screw 84a are all located at one side of the device while the handle is underneath body 22a in a plane perpendicular to the axes of the bolts and screw. This contrasts with device 20 where the plane of handle 24 is parallel to the axes of bolts 44 and 57 and screw 84.

To set up both welding devices 20 and 20A for operation, an electrode 40 is selected and the exposed end of core 36 is inserted into the tip of chuck 32 or 32a where it is engaged by bolt 44 or 44a when knob 46 or 46a is tightened. An appropriate shroud 80, 80A, 80B or 80C is selected, inserted into block 70 or 70a and secured by screw 84. Cable 25 or 25a is connected to an appropriate power supply. The free end of the electrode will normally be spaced about one-quarter of an inch from the adjacent end of the shroud. The sheet to be welded to another sheet, plate or other metal member is also connected to the power supply. For operation, the welding device will be disposed axially perpendicular to the work to be welded as shown in FIG. 14. The handle 24 or 24a is pressed down until the electrode contacts the work. There will be a self-contained flash generated as contact is made. The handle will then be pressed down further slightly and held momentarily, and then let up to break the arc. A button or rivet weld W' as shown in 10 will result.

For sheet metal spot welding the same procedure is followed except that the electrode is applied for a shorter time and with lighter applied pressure. For making holes in a piece of metal a higher welding current will be used and the electrode will be pushed through the metal. It will then be quickly withdrawn before the hole can be welded closed. For stud welding, the stud will be held by pliers and will be welded from the opposite side of f the metal to which it is to be attached. For tacking up sheets to be welded permanently later, the same procedure as in spot welding is employed. Other welding jobs can be done with equal speed, accuracy and ease.

The welding devices can readily be disassembled for replacement of any worn or broken parts. The devices can be manufactured at relatively low cost as compared with conventional welding devices of comparable welding abilities.

While a limited number of embodiments of the invention have been described, this has been by way of example only. Man modifications are possible without departing from the invention as claimed.

What is claimed is:

1. A welding device, comprising an elongated electrically insulative body with a handle extending outwardly of said body; a cylindrical electrically conductive chuck carried by said body and extending axially thereof for engaging one end of a straight electrode at one end of the chuck, said body having a plurality of laterally spaced longitudinal bores; a U-shaped frame having a pair of parallel arms slidably disposed and frictionally engaged in two of said longitudinal bores in said body; a block slidably mounted on said arms; springs on the arms urging the block toward free ends thereof, said block having an opening for removably receiving a cylindrical shroud; locking means on the block for holding the shroud in the block axially parallel to said arms while the free other end of the electrode extends axially of the shroud and block and terminates inside the shroud; and a cylindrical shroud removably engaged in said opening in the block, said shroud having a notched free end shaped to contact a correspondingly shaped surface of a piece of work to be welded, the other end of the shroud being constricted to define a narrow opening for passing fumes out of the shroud through the last named opening and through notches in said free end of the shroud while the shroud surrounds the electrode extending axially thereof.

2. A welding device as defined in claim 1, further comprising clamping means on said block for adjusting the frictional grip of the block on the arms.

3. A welding device as defined in claim 2, wherein another one of the bores in said body is threaded, said chuck being engaged in said other one bore; and an insulated cable connected to said body and terminating at said chuck for passing electric current through the chuck and electrode.

4. A welding device as defined in claim 3, further comprising an insulative shield surrounding the electrode and engaged on said one end of the chuck.

5. A welding device as defined in claim 1, wherein the free end of the shroud has angular portions for engaging a corner of a piece of work to be welded.

6. A welding device as defined in claim 3, wherein the cable passes through said handle into said body.

7. A welding device as defined in claim 3, wherein the cable passes through a side of said body clear of said handle.

8. A welding device as defined in claim 1, wherein the handle is flat and disposed perpendicular to the plane of the U-shaped frame.

9. A welding device as defined in claim 1, wherein the handle is flat and disposed parallel to the plane of the U-shaped frame.

* * * * *